United States Patent

[11] 3,576,246

| [72] | Inventors | Frank A. Hulet;<br>Wilmer J. Friesen, Hutchinson, Kans. |
|---|---|---|
| [21] | Appl. No. | 804,508 |
| [22] | Filed | Mar. 5, 1969 |
| [45] | Patented | Apr. 27, 1971 |
| [73] | Assignee | M. W. Hartmann Manufacturing Co., Inc.<br>Hutchinson, Kans. |

[54] FOUNDRY MOLD CONVEYOR SYSTEM
7 Claims, 13 Drawing Figs.

[52] U.S. Cl. ................................................. 198/19,
164/324, 198/85, 198/221
[51] Int. Cl. ....................................................... B23q 5/26,
B65g 37/02
[50] Field of Search ........................................... 198/19, 24,
82, 85, 221; 25/41.3; 164/324, 329

[56] References Cited
UNITED STATES PATENTS

| 699,132 | 5/1902 | Allis | (198/24)UX |
| 2,767,865 | 10/1956 | Lasater et al. | 164/324X |
| 2,768,756 | 10/1956 | Horman | 198/24X |
| 2,999,579 | 9/1961 | Kostrzewa | 198/221X |
| 3,184,030 | 5/1965 | Ludwig | 198/85X |

*Primary Examiner*—Robert G. Sheridan
*Attorney*—Miner L. Hartmann

ABSTRACT: A conveyor system for the intermittent movement of foundry sand molds on pallets from a molding station through the metal pouring and solidifying stations, through jacket and weight transfer stations, to a shake-out station, and with return of pallets to the molding machine, is disclosed, including means for transferring the molds on pallets through right-angled turns to adjacent parallel paths of a conveyor means. The jackets and weights are transferred, under separate manual operation, from closely adjacent parallel portions of the conveyor path. The step-by-step movement of the pallets follows a repeated sequence in which all pallets on long conveyor sections are moved simultaneously forward one pallet length followed by simultaneous movement of all pallets one pallet length on all cross conveyor sections which connect the long conveyor sections. The timing may be automatic or manually controlled.

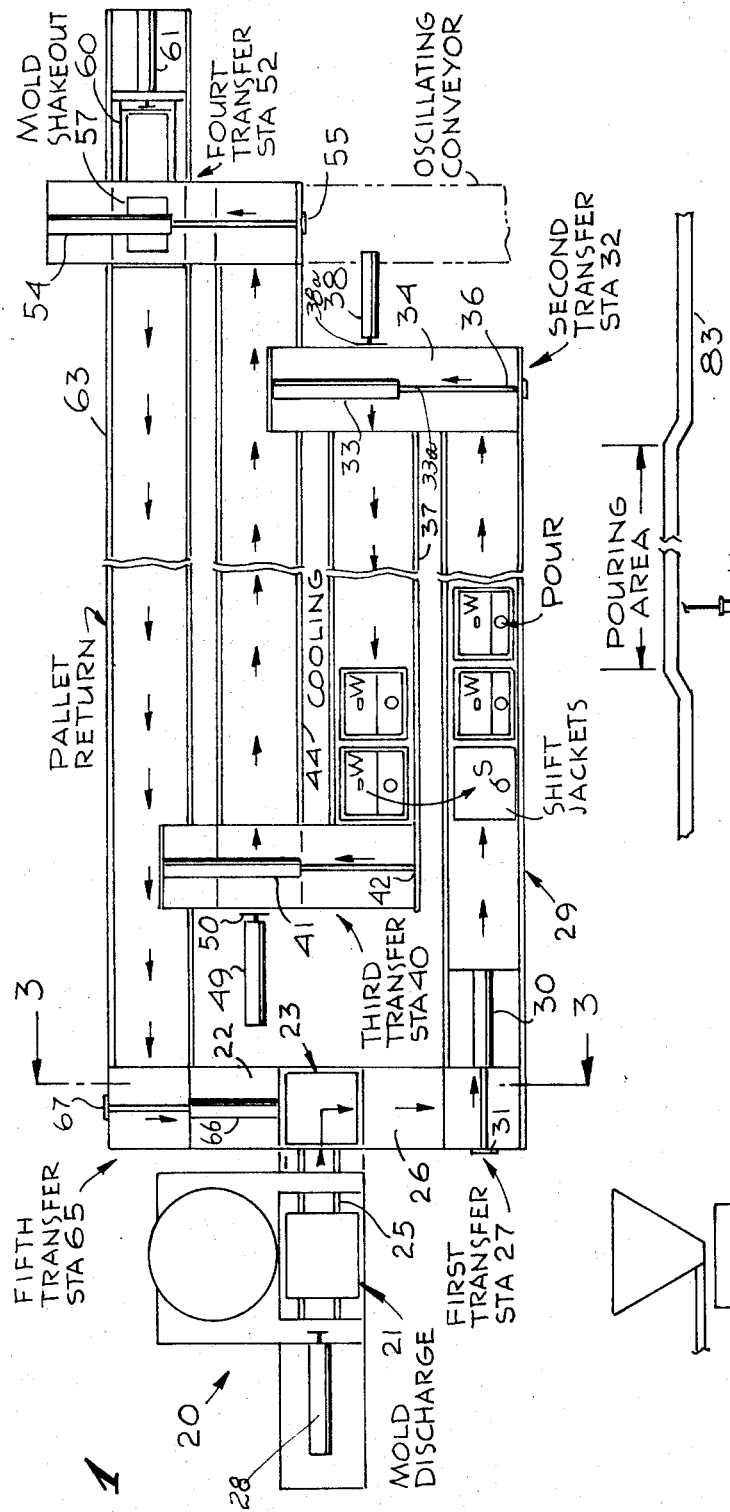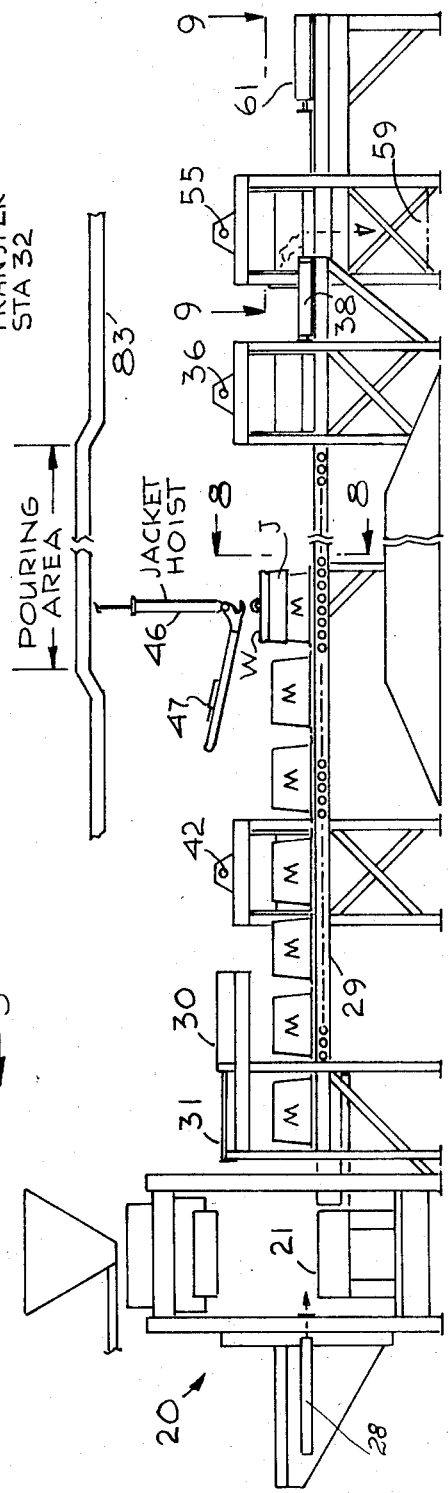

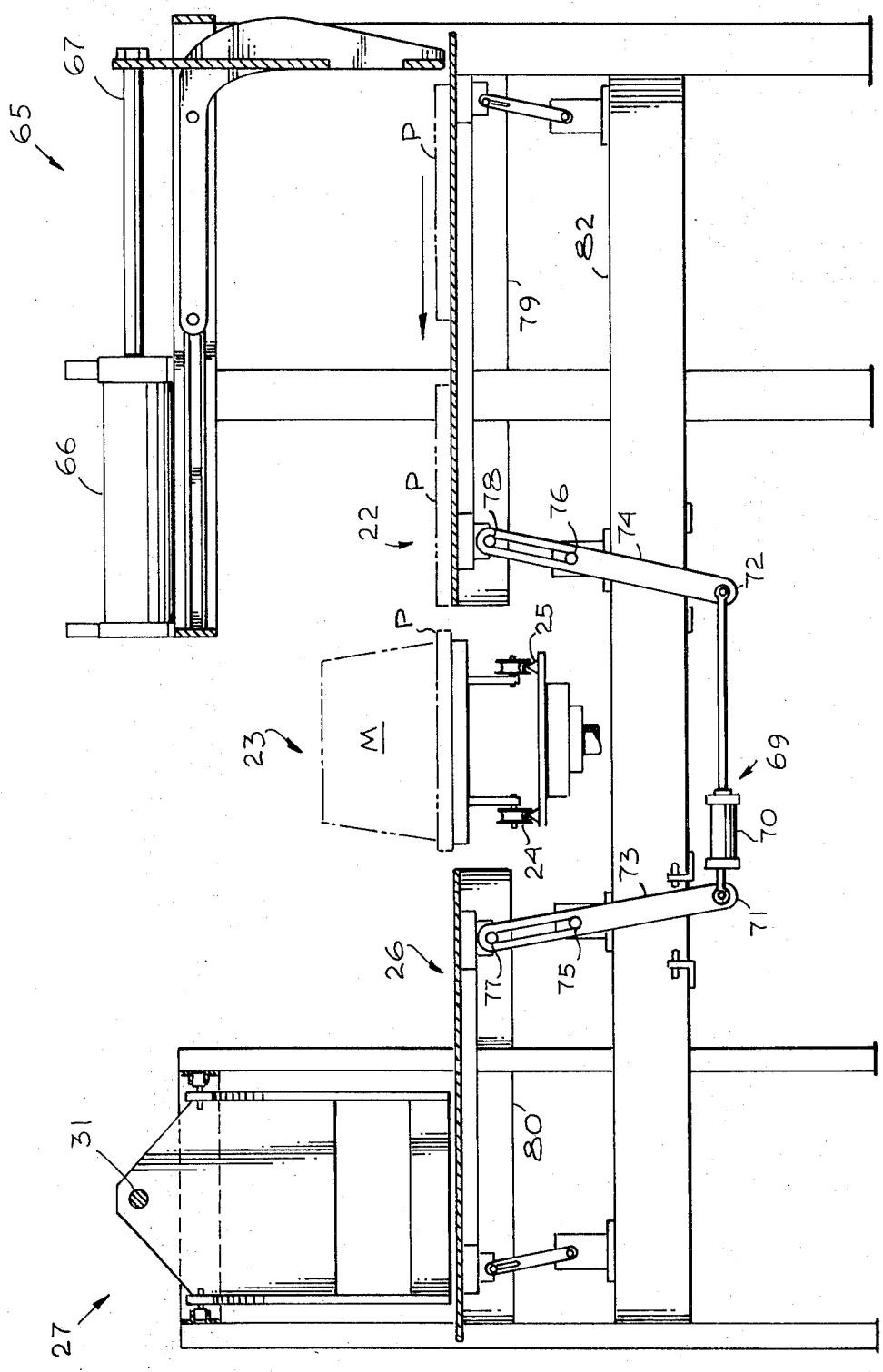

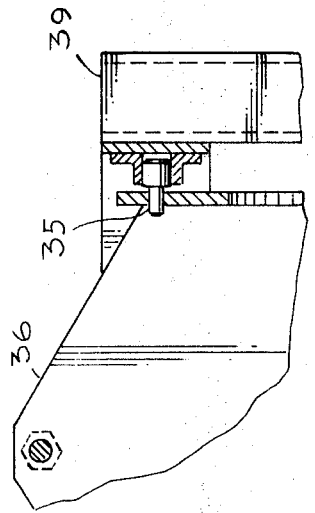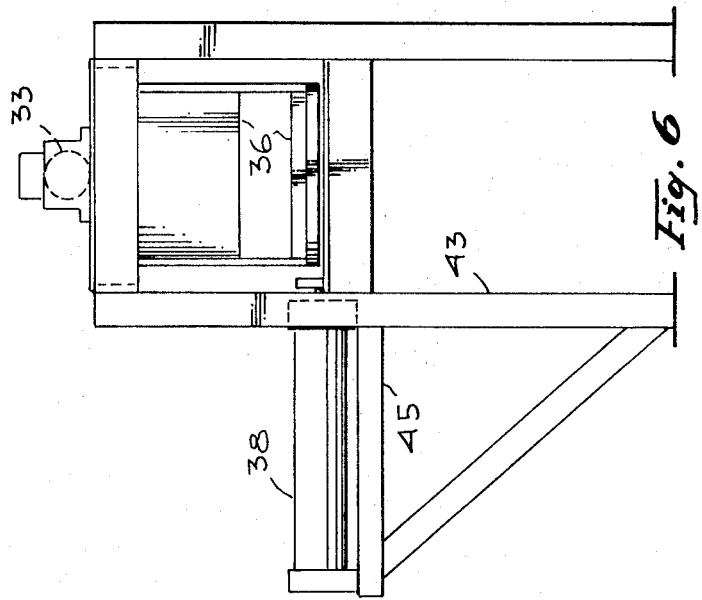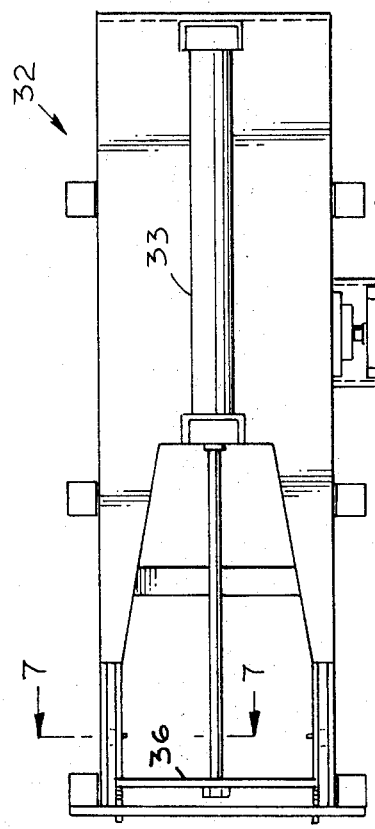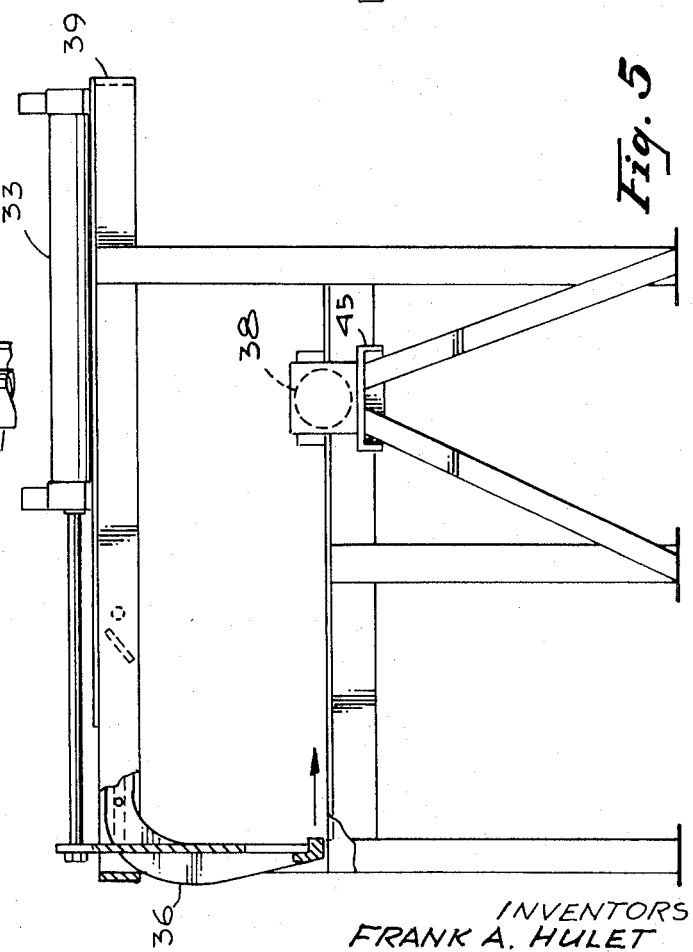

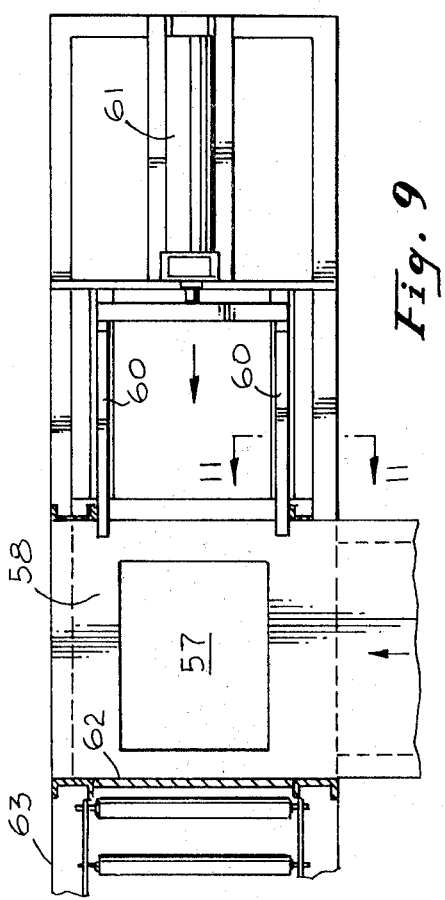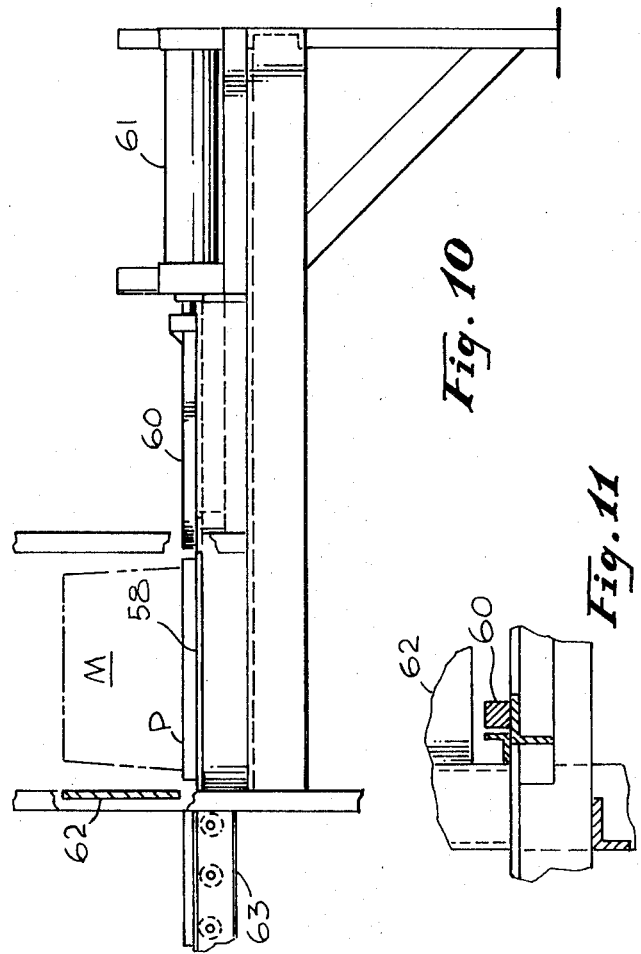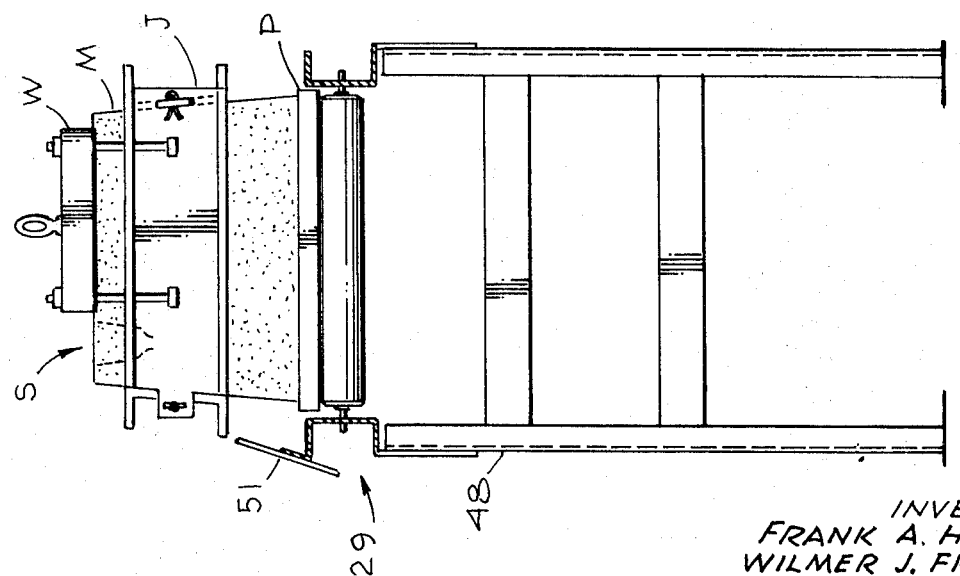

INVENTORS
FRANK A. HULET
WILMER J. FRIESEN
BY
ATTORNEY

FOUNDRY MOLD CONVEYOR SYSTEM

SUMMARY OF THE INVENTION

The principal object of the invention is to provide an intermittent conveyor, or step-by-step, means for handling sand molds in a foundry casting operation, or the like, and requiring a minimum of manual labor in the employment of said molds. Another object is to convey foundry molds on individual pallets around an outer and inner looped path, with right angled turns, so that jackets and weights may be transferred manually across adjacent parallel courses of the conveyor. Another object is to provide ram or compressed fluid piston in cylinder means for the simultaneous intermittent movement of the molds resting on individual pallets, from one "corner" of the conveyor to the next "corner," in a path from the mold making machine to the shake out station, and then moving the empty pallets back to the mold making machine, in a circuit.

Another object is to provide means in a conveyor circuit for the step-by-step movement of square pallets which follows a repeated sequence in which all pallets on long conveyor sections are moved simultaneously forward for one pallet length followed by the simultaneous movement of all pallets for one pallet length on all cross conveyor sections which connect the long conveyor sections in forming a complete circuit, the timing being automatic or manually controlled.

These and other objects are attained by my invention, which is further described below, reference being made to the accompanying drawings showing a preferred embodiment and alternate forms.

BRIEF DESCRIPTION OF THE DRAWINGS

FIG. 1 is a plan view of a preferred embodiment of a foundry mold conveyor system;

FIG. 2 is a side elevational view showing the same;

FIG. 3 is a vertical sectional view taken on the line 3–3 of FIG. 1, looking toward the molding machine;

FIG. 4 is a plan view of the second transfer station of the system;

FIG. 5 is a side elevational view of the same;

FIG. 6 is an end elevational view of the same;

FIG. 7 is a fragmentary cross-sectional view taken on the line 7–7 of FIG. 4;

FIG. 8 is an elevational view taken from the position indicated by line 8–8 of FIG. 2;

FIG. 9 is a plan view partly in section taken on the line 9–9 of FIG. 2;

FIG. 10 is a side elevational view of FIG. 9;

FIG. 11 is a fragmentary sectional view taken on the line 11–11 of FIG. 9;

DESCRIPTION OF THE PREFERRED EMBODIMENT

Figure 12:
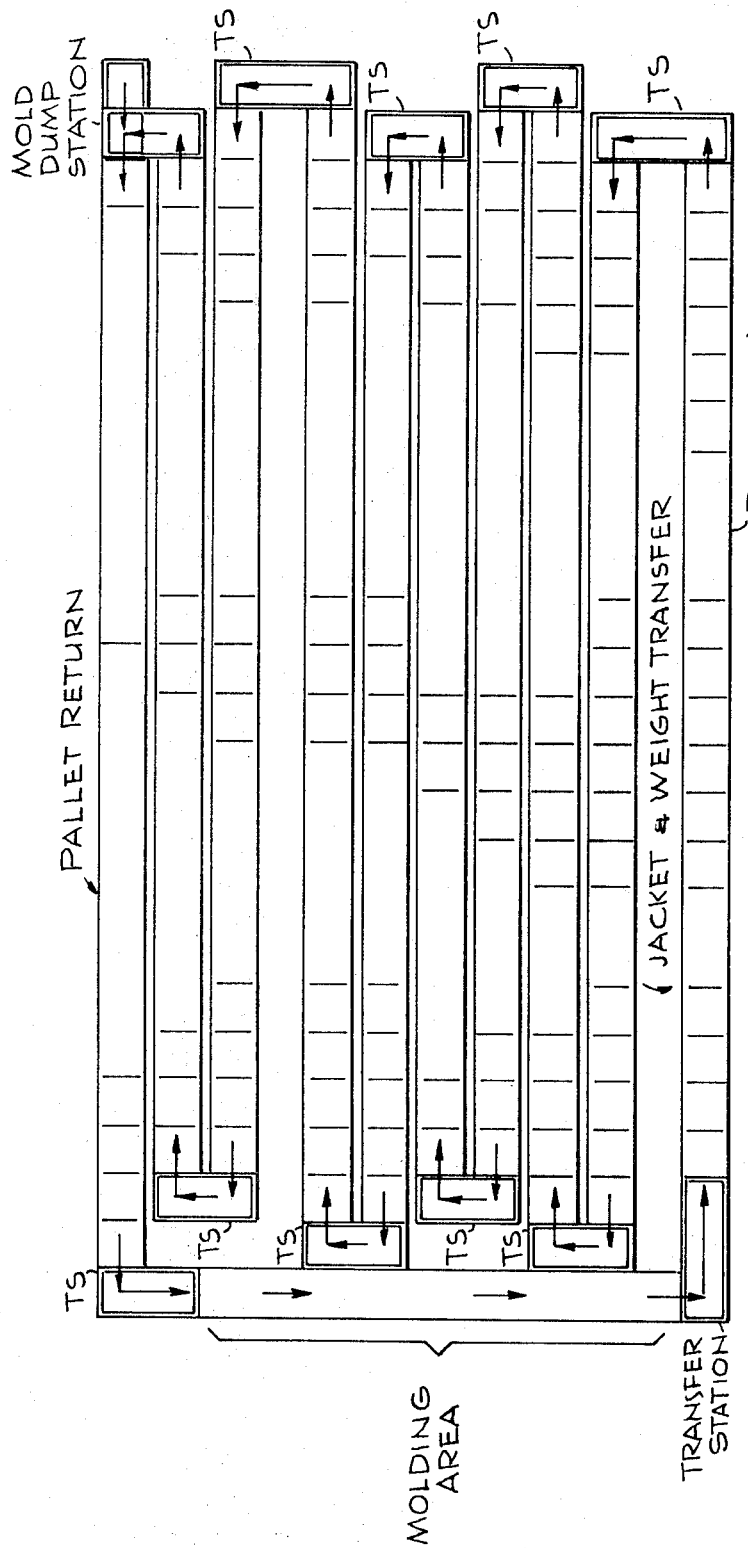
FIG. 12 is a diagrammatical plan view of a first alternative conveyor system following this invention.

Referring to the drawings, particularly FIGS. 1 and 2, a conveyor means is shown, consisting of various lengths of conveyor sections having smooth sliding surfaces or, alternatively, a succession of cross rollers mounted on spindles held between level parallel side members of a structural steel frame being supported by means from the floor, said sections forming an outer rectangular path and an interior loop path which brings the interior runs of the conveyor into parallel relation to the exterior runs, with transfer stations at each corner or right angled turn of the entire path of the conveyor.

It will be understood that the molds, pallets, jackets and weights used in the following description are not part of the invention but these articles are commonly used in the operation of a foundry and are referred to herein to clarify the description of the conveyor system and to describe its functions. Starting at a mold-making machine 20, which may be of any suitable kind, a foundry mold formed of moist sand and binder composition is delivered to the conveyor system of this invention manually or by a bridging means between the fifth transfer station 65 and the first transfer station 27. In the preferred means shown in the drawings, FIGS. 1, 2 and 3, a transfer car 23, arranged to move transversely to the conveyor, moves on wheels 24 on tracks 25, from a position in alignment with the adjacent conveyor sections to the mold discharge floor 21 of the molding machine 20. The newly formed mold M is slid from the machine molding floor 21 on to a rectangular pallet P resting on the top of a transfer car 23 which is positioned adjacent the forward edge of the molding floor 21, the top surface of the pallet on the car being in alignment with said molding floor. The formed sand mold may be pushed on to the pallet on the car manually or by a pneumatic ram 28 as shown, this being an integral part of the molding machine 20. The transfer car 23 is then returned into operational alignment with the short section 22 of the conveyor system conveying empty pallets from transfer station 65 and with the short conveyor section 26 which leads into a first corner transfer station 27. The pallet, supporting a newly made mold M is moved from the transfer car 23 into the transfer station by the thrust of the returned pallets, being activated step-by-step at the fifth pallet transfer station 65 as will be later described.

It has been found that the movement of the freshly made mold on its pallet from the transfer car can be facilitated by auxiliary means 69 which bring the adjacent ends of the two short conveyor sections 22 and 26 into close contact with the edges of the transfer car top surface, the actual movement along the conveyor being initiated by the ram 66 at the fifth transfer station. The auxiliary means 69 consists essentially of a ram 70 which is mounted between the lower ends 71 and 72 respectively of lever arms 73 and 74, which are pivoted at 75 and 76 to a structural member 82. These lever arms at their upper ends 77 and 78, respectively, are pivotally attached to roller supporting rails 79 and 80, these latter being adapted to longitudinal displacement for the short distance necessary to bring the top surfaces of short conveyors 22 and 26 against the transfer car, to effect smooth movement of the mold, and of the oncoming empty pallet in relation to the transfer car. The ram 70 is actuated automatically in sequence with the movement of the transfer car 23 back and forth in relation to the molding machine, and in the step-by-step movement of the conveyor system.

At the first transfer station 27, each pallet (supporting a freshly made mold) is pushed on to a long roller conveyor section 29, by the overhead ram 30 actuating the puller 31, all of the pallets on this conveyor (from previous steps) being moved forward, step by step, by the last pallet pushed out of this first transfer station. This conveyor section 29 carries the row of pallets with empty molds through a jacketing and weighting area, where jackets J and weights W are manually placed on the molds M, after which the jacketed and weighted molds, as they are moved forward step by step through the pouring area, are each filled with molten metal from manually operated ladles (not shown), suspended from the overhead trolley rail 83, shown in FIG. 2. The filled and partly cooled molds on their individual pallets, with jackets and weights, then enter, one by one, the second transfer station 32. Each pallet with its metal-filled mold is then moved at right angles out of the transfer station 32 on to short conveyor section 34, by means of the overhead ram 33 and pusher 36 until it is aligned on the first leg of the inner loop roller conveyor 37. From this position, the pallet and the metal filled mold therein is moved at right angles to the previous path on short conveyor 34 of the ram 38 and pusher 38a pushing the previously placed similarly filled molds by one pallet length, the forward pallet with its filled mold entering the third transfer station 40. During the passage of the pallets and molds along the first leg 37 of the inner conveyor loop, the weights W and the jackets J are removed manually by the aid of the powered hoist 46 and manipulating lever 47 and placed on the new molds on the adjacent conveyor section 29 before reaching the metal pouring area. At the third transfer station 40 the overhead ram 41 and puller 42 pulls the pallet and mold into alignment with the pallets and molds on the second leg 44 of the inner loop roller conveyor. From this position the pallet and filled mold thereon is moved along the path of the second inner loop leg 44 of the conveyor by the ram 49 and pusher 50, pushing the previously placed pallets and molds along the conveyor system 44 by one pallet length, in step-by-step movement.

The pallets and molds containing the cooled castings enter, one by one, the fourth transfer station 52, and are then moved at right angles by the ram 54 and the puller 55. Each pallet with its mold and casting here slides into position over a large opening 57 in the bottom slide plate 58, there being provided a shake out pit 59 below the opening. The pallet is then pushed out from under the mold, by the pusher side arms 60 actuated by the ram 61, allowing the casting and mold to fall into the shake out pit 59. An oscillating conveyor moves the material out of the pit.

The empty pallet is pushed on to the pallet return leg 63 of the outer conveyor section which is parallel to the first long conveyor section 29, the previously emptied pallets being moved step-by-step toward the fifth transfer station 65. At the fifth transfer station, the pallets, one by one, are moved at right angles to the direction of the pallet return conveyor section 63 by the ram 66 and puller 67, into position to move on to the transfer car 23 in front of the mold making machine 20.

The above description has covered the operation separately at each transfer station, and on each section of the conveyor system. The coordinated action of the system is as follows: when the mold making machine 20 has ejected a mold M on to a pallet P on the transfer car 23, and the pallet is placed in alignment with the adjacent short conveyor section 26, an actuating switch completes an electric circuit to solenoids which open valves admitting compressed fluid into rams 30, 38, 49 and 61, on transfer tables 1, 2, 3, 4 and 5 to move the pallets and molds forwardly a distance of one pallet length. After these rams have completed their motion, they stop and actuate solenoid valves which reverse the piston direction and return them to their starting positions, where an electrical contact is made which actuates the valves of each of the rams 33, 41, 54 and 66 operating at right angles to the first set of rams, thus moving the respective pallets forward one pallet length, and the rams then return to their starting positions. The forward movement of the empty pallet by the ram 66 moves the pallet and newly made mold from the transfer car 23 on to the short conveyor section 26, and also pushes the previously made mold on its pallet into the first transfer station. The transfer car 23 with an empty pallet is then moved to the position adjacent the molding machine floor 21 to receive the next made mold. During the intervals between discharge of a newly made mold from the mold making machine and the forward movement of the pallet and mold from the transfer car on to the conveyor section 26, the jackets and weights are transferred as previously described by the manually manipulated air hoist 46 from the molds on the first leg of the inner loop conveyor to the new molds on the first long roller conveyor section 29. Following this operation, the molten metal is manually poured from ladles into each jacketed and weighted mold in its turn. Also the molds and the contained cooled castings are discharged at the shake out transfer station, and the empty pallets returned to transfer station five, and thence to the transfer car.

Where the word "ram" is used herein and in the claims, it is intended to include a fluid-operable piston and cylinder means, together with the reversing valve mechanism including solenoid or other electrical means together with the required stop and start switches associated therewith, for each ram; and the ram may operate either to push or to pull the associated means which make contact with the pallets.

In FIGS. 4, 5, 6 and 7 there is shown in greater detail a typical transfer station, specifically the second transfer station, shown generally in FIGS. 1 and 2. The conveyor surfaces are supported on suitably placed structural steel legs 43. The piston rod 33a of the ram 33 is attached to the formed puller 36 which is supported and movable on track wheels 35 rolling on overhead horizontal frame members 39. The second ram 38 of the second transfer station is disposed at right angles to the ram 33, and supported on frame member 45 at the general elevation of the conveyors.

In FIG. 8 there is shown in elevation a mold M on a pallet P at the pouring area along conveyor section 29, the jacket J and the weight W being in position, and showing a pouring gate S. The supporting frame for the conveyor section is indicated at 48; a shield 51 is also shown adjacent the outer mold surface to protect it against injury by contact with the molten metal ladle.

In FIGS. 9, 10 and 11 there is shown in plan and elevation in greater detail the fourth transfer station, in which the pallet P is pushed out from under the mold M and the contained solidified casting, as it rests on the outer edges of a bottom slide plate 58, having a large opening 57 therethrough, by the pusher arms 60 actuated by ram 61, there being a partition 62 to hold back the mold. The mold and casting fall into the shake out pit 59, where the sand of the mold and the casting are separated, and the pallet P is moved on to the pallet return conveyor section 63.

In FIG. 12 is shown in diagram form an alternative plan for a conveyor system in which a plurality of left-to-right and right-to-left paths are provided, in side-by-side relation, with transfer stations at the ends. The direction of movement of the pallets is changed from one line to the next by transfer stations having rams which first move the pallets at right angles to the original path, to a position in alignment with the next parallel conveyor, and a second ram which then moves the pallets on this second conveyor section. The pallets are moved to each succeeding conveyor section in the same way by means of the right angle transfer station means. A relatively long cross conveyor section connects the final longitudinal conveyor section which moves in the opposite direction to the first conveyor section, with the first transfer station means. As applied to foundry operations, new molds resting on square pallets are placed on the long cross conveyor section, these molds being produced by hand operation or by a single or a plurality of molding machines. The transfer of jackets and weights may be made between the first and second conveyor sections, and the pouring of the molten metal into each mold may be performed following its jacketing and weighting. After cooling by movement on the several conveyor paths, the cooled molds and castings may be discharged into a shake out pit at the beginning of the last conveyor section, as previously described for the preferred form, and the empty pallets then are returned to the last transfer station and to the long cross conveyor section. The movement of the pallets is step-by-step, first simultaneously moving all pallets on the conveyors in their longitudinal paths, followed by simultaneous movement in a direction at right angled paths in the several transfer stations, as previously described in the description of the functioning of the preferred embodiment.

Figure 13:
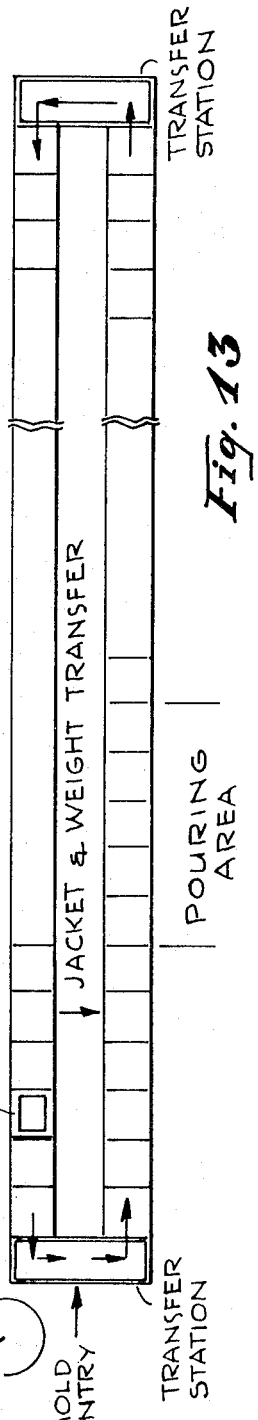
FIG. 13 is a diagrammatical plan view of a second alternative conveyor system following this invention.

In FIG. 13 is shown in diagram form, a second alternative plan for a conveyor system in which only two long conveyor paths and two short cross conveyor paths are provided, using the right angle transfer stations with ram means for moving the pallets, and functioning in the same step-by-step manner as previously described.

The necessary piping for fluids to the rams, and the electrical connections and switching means, are omitted for clarity in the drawings, and relay and timer controls are also not shown since these are conventional in automatic equipment of this kind.

We claim:

1. A foundry sand mold conveyor system for the intermittent synchronous movement of load supporting pallets, said system comprising:

a. a succession of long parallel conveyor sections with right angle cross conveyors at the end of each section, making an outer rectangular path and at least one reentrant inner rectangular open loop portion, all forming a complete circuit;

b. transfer station means disposed at the end of each conveyor section of the circuit comprising two rams disposed at right angles to each other, the first ram being arranged to move the forward pallet from a first long conveyor section of each pair of sections on to an adjacent cross conveyor including all pallets positioned on said cross conveyor, and said second ram being arranged to move the forward pallet on said cross conveyor at right angle thereto on to an adjoining second of a pair of long conveyor section disposed parallel to said first long conveyor section, and also to move all pallets thereon for one pallet length in the opposite direction to the movement of said first long conveyor section, the forward pallet on said second long conveyor being moved into said next transfer station;

c. control means for actuating the ram means at each transfer station at selected time intervals;

said conveyor system being arranged to move a succession of pallets around the circuit step-by-step through a plurality of mold manipulatory stations.

2. The foundry sand mold conveyor system defined in claim 1, in which the manipulatory stations comprise a mold forming station, a metal pouring station, cooling sections, a shake out station, and pallet return means to deliver the empty pallets to a position adjacent said mold forming station.

3. The foundry sand mold conveyor system defined in claim 1, in which the manipulatory stations comprise a mold forming station, a mold jacketing station, a metal pouring station, a jacket removal station, a casting shake out station, and a pallet return means.

4. The foundry sand mold conveyor system defined in claim 1, in which the ram means comprises for each station a fluid cylinder and piston means which operatively engages the rearward edge of the last pallet on a section which is to be moved, whereby to move all the abutting pallets in said section forwardly by one pallet length.

5. The foundry sand mold conveyor defined in claim 1 in which said control means simultaneously actuates all ram means directed parallel to the conveyor sections alternately with actuation of all ram means directed at right angles thereto, for step-by-step synchronous movement of the pallets in each case by one pallet length.

6. A 180 degree transfer station for a foundry mold conveyor system in which load bearing pallets are moved on a succession of parallel long conveyor sections connected by cross conveyor sections at right angles thereto and wherein said pallets are turned in direction by 180 degrees comprising:

a supporting frame including corner flat bed plates at the elevation of said conveyor section, disposed adjacent ram means for moving the pallets;

a pair of rams disposed at right angles to each other, the first ram having a puller means operatively engaging the rearward edge of a pallet resting on a first flat bed plate, and adapted to move said pallet forwardly by one pallet length on to an adjoining cross conveyor, including also all pallets positioned ahead of it on said cross conveyor, the forward pallet being then disposed on a flat plate, and said second ram operatively connected to pusher means being arranged to move the forward pallet resting on a second flat bed plate at the end of said cross conveyor at right angles thereto, on to an adjoining long conveyor section for one pallet length, and to also move all pallets on said long conveyor for one pallet length, the forward pallet on said long conveyor section being thereby moved on to the flat plate of the next transfer station.

7. The transfer station defined in claim 6 in which the said second flat bed plate is provided with a large opening therethrough, and said second ram pushes said pallet across said opening and through a slot in a partition wall on to said long conveyor section, thus dropping off the mold and contents into a shake out pit.